United States Patent
Tanaka et al.

(10) Patent No.: US 7,565,792 B2
(45) Date of Patent: Jul. 28, 2009

(54) FUEL GAS HEATING CONTROL EQUIPMENT AND GAS TURBINE POWER GENERATION FACILITY PROVIDED WITH THE FUEL GAS HEATING CONTROL EQUIPMENT

(75) Inventors: Satoshi Tanaka, Hyogo-ken (JP); Toshimitsu Morimoto, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 486 days.

(21) Appl. No.: 11/294,542

(22) Filed: Dec. 6, 2005

(65) Prior Publication Data

US 2006/0117757 A1 Jun. 8, 2006

(30) Foreign Application Priority Data

Dec. 7, 2004 (JP) .............................. 2004-353534

(51) Int. Cl.
*F02C 9/00* (2006.01)
*F02G 3/00* (2006.01)

(52) U.S. Cl. ................................................. 60/39.281

(58) Field of Classification Search .............. 60/39.281, 60/736, 772, 776
See application file for complete search history.

(56) References Cited

U.S. PATENT DOCUMENTS

| 4,219,738 | A | * | 8/1980 | Griesinger | 290/40 R |
| 4,696,156 | A | * | 9/1987 | Burr et al. | 60/39.08 |
| 5,845,481 | A | * | 12/1998 | Briesch et al. | 60/776 |
| 6,939,392 | B2 | * | 9/2005 | Huang et al. | 95/46 |

FOREIGN PATENT DOCUMENTS

| JP | 7-83074 | 3/1995 |
| JP | 11-236824 | 8/1999 |

* cited by examiner

*Primary Examiner*—Michael Cuff
*Assistant Examiner*—Andrew Nguyen
(74) *Attorney, Agent, or Firm*—Westerman, Hattori, Daniels & Adrian, LLP.

(57) ABSTRACT

A fuel gas heating control equipment in accordance with the present invention is provided with a gain-determining portion 21 and a time-constant-determining portion 22 which determine values of a gain and a time constant to be used for PI calculations being performed by a PI calculation portion 14. The gain-determining portion 21 specifies a small time constant for the PI calculation portion 14 during load fluctuations when the generator output increases, and specifies a large time constant for the PI calculation portion 14 when the generator output reaches the maximum output. In consequence, during load fluctuations, responsiveness is good and a rapid change in temperature can be followed, so that a fuel gas temperature will not fluctuate in response to a slight change in temperature at the maximum output, thereby achieving a stable fuel gas temperature.

20 Claims, 9 Drawing Sheets

FUEL GAS HEATING CONTROL EQUIPMENT AND GAS TURBINE POWER GENERATION FACILITY PROVIDED WITH THE FUEL GAS HEATING CONTROL EQUIPMENT

The present invention is based on the Japanese Patent Application applied as No. 2004-353534 on Dec. 7, 2004.

BACKGROUND OF THE INVENTION

1. Field of the Invention

The present invention relates to a fuel gas heating control equipment of a gas turbine, and especially, relates to fuel gas heating control equipment which controls the flow rate of a fuel gas passing through a heater being installed to a fuel gas system. In addition, the present invention relates to a gas turbine power generation facility being provided with the fuel gas heating control equipment as aforementioned.

2. Description of the Prior Art

A conventional gas turbine has a heater installed to a stage preceding a combustor in order to enhance combustion efficiency of a fuel. (See the Japanese Patent Application Laid-Open No. H11-236824.)

FIG. 10 is a diagram showing an example of a fuel system of a conventional general gas turbine power generation facility. In a gas turbine power generation facility 1, a compressor 2, a gas turbine 3 and a generator 5 are connected concentrically, and the generator 5 generates electric power by having the gas turbine 3 provided with torque for rotation by a combustion gas being supplied from the combustor 4

The gas turbine power generation facility 1 provides the combustor 4 with high pressure air being generated by the compressor 2 and at the same time causes combustion by supplying a fuel gas to the combustor 4 from a combustor flow control valve 8. In addition, by supplying the high pressure air being generated by the compressor 2 to a heater 6 and heating a specific amount of the fuel gas being supplied to the heater 6 in the stage preceding the combustor 4, combustion efficiency of the combustor 4 is enhanced. A bypass flow control valve 9 is for a purpose of adjusting the flow rate of a fuel gas being supplied to the heater 6, and a part of the fuel gas being supplied to the bypass flow control valve 9 is supplied to a subsequent stage to the combustor 4 without being heated by bypassing the heater 6. In the subsequent stage to the heater 6, the fuel gas being heated in the heater 6 and the fuel gas not being heated by bypassing the heater 6 are mixed and supplied to the combustor flow control valve 8. Additionally, the subsequent stage to the heater 6 is provided with a temperature-detecting element 7 for measuring the gas temperature of the fuel gases being mixed.

Moreover, the gas turbine power generation facility 1 is provided with a combustor flow control portion 11 specifying the lift of a combustion flow control valve 8 and a bypass flow control portion 12 controlling a control input of the bypass flow control valve 9. By supplying the combustor flow control valve 8 with a value being specified by the combustor flow control portion 11 as the control input, the lift of the combustor flow control valve 8 is adjusted, thereby adjusting the flow rate of the fuel gas to be supplied to the combustor 5. In addition, by having the bypass flow control portion 12 adjust the control input of the bypass flow control valve 9 based on a predetermined calculation, the flow rate of the fuel gas bypassing the heater 6 is adjusted.

The bypass flow control portion 12 is provided with a specified-temperature-determining portion 13 which determines and outputs an aimed specified temperature being uniquely determined in accordance with the output at the time when the output of the generator 5 is supplied; a subtracter 15 which calculates a difference value by comparing with an aimed specified temperature being determined by the specified-temperature-determining portion 13 when the fuel gas temperature is supplied by the temperature-detecting element 7 being provided to the subsequent stage to the heater 6; and a PI calculation portion 14 which performs calculations for PI control for the subtraction results of the subtracter 15 and obtains a control input of the bypass flow control valve 9. The PI calculation portion 14 is provided in advance with a gain "K" and a time constant "T" that are necessary values for calculations for PI control and performs calculations on the basis of the gain "K" and the time constant "T." Then, the control input being calculated by the PI calculation portion 14 is supplied to the bypass flow control valve 9, and the lift of the bypass flow control valve 9 is adjusted on the basis of the control input.

When the output of the generator 5 is supplied, the specified-temperature-determining portion 13 provides the PI calculation portion 14 with a value as a specified temperature, which is uniquely determined in accordance with the output at the time. FIG. 11 is an example of a graph showing the relation between the generator output and the specified temperature.

As shown in FIG. 11, the specified-temperature-determining portion 13 specifies the aimed specified temperature in a manner that the aimed specified temperature ascends in accordance with an increase in the generator output until the generator output reaches the maximum output Wx. In addition, when the generator output is more than the maximum output Wx, the aimed specified temperature is set to be a predetermined value "τx."

In accordance with a method disclosed in the Japanese Patent Application Laid Open No. H11-23682, as shown in FIG. 11, the aimed specified temperature being specified by the specified-temperature-determining portion 13 increases rapidly, in accordance with an increase in the generator output during load-up (including start-up). Therefore, it is necessary for the bypass flow control portion 12 to respond to the rapid change by setting the value of the time constant "T" in the PI control to be small.

However, when the time constant "T" is made small, even a slight change is responded to although the generator output has attained the aimed maximum output Wx. As a result, there exists a problem that the combustion gas temperature cannot be stable but fluctuate, which causes the combustion state in a combustor to be unstable.

On the contrary, when the time constant "T" is increased, there exists a problem that an accurate control is impossible because the fuel gas temperature cannot follow a rapid change in the aimed specified temperature in a condition where the generator output fluctuates during load-up and the like.

SUMMARY OF THE INVENTION

It is an object of the present invention to provide a fuel gas heating control equipment that improves the following capability of the fuel gas temperature at the time of load fluctuation and that can restrain the fluctuation range of the fuel gas temperature at a specific load (at the maximum output).

In order to achieve the above object, the fuel gas heating control equipment in accordance with the present invention comprises: a heater which heats a fuel gas being supplied: a first gas system which supplies the fuel gas to the heater; a second gas system which is diverged in a stage preceding the heater so as to bypass the heater and connected to the first gas system in a subsequent stage to the heater; a temperature-detecting element which measures the gas temperature of a mixed fuel gas being generated by having a first fuel gas passing through the first gas system with being heated by the heater and a second fuel gas passing through the second gas system without being heated by the heater mixed in the subsequent stage to the heater; a bypass flow control valve which adjusts the flow rate of the second fuel gas; and a bypass flow control portion controlling a lift of the bypass flow control valve and adjusting a lift of the bypass flow control valve by performing feedback control in accordance with an output of the generator by performing PI control based on results of comparison between an aimed temperature being specified in accordance with an output of a generator and the gas temperature being detected by the temperature-detecting element and by changing a gain and a time constant in the PI control in accordance with an output of the generator.

In accordance with the fuel gas heating control equipment in accordance with the present invention, it is possible to improve the following capability of the fuel gas temperature during a load fluctuation and to restrain the fluctuation range of the fuel gas temperature at a specific load (at the maximum output) simultaneously. As a result, stable combustion state can be achieved in any operational condition, thereby enhancing the combustion efficiency of a fuel gas.

DESCRIPTION OF THE PREFERRED EMBODIMENTS

First Embodiment

Figure 1:
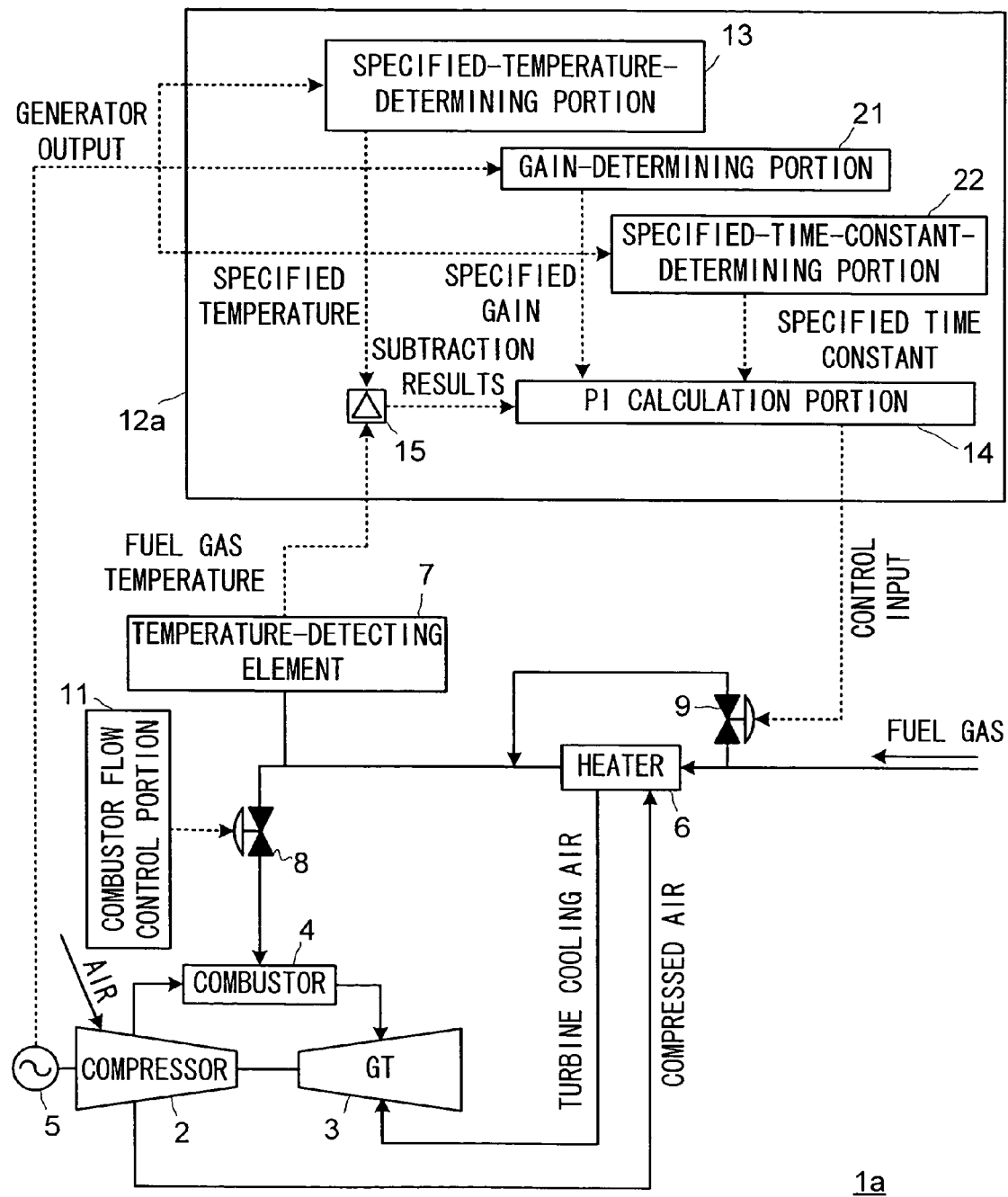
FIG. 1 is a block diagram showing a construction of a gas turbine power generation facility being provided with a fuel gas heating control equipment in accordance with a first embodiment of the present invention.
Figure 10:
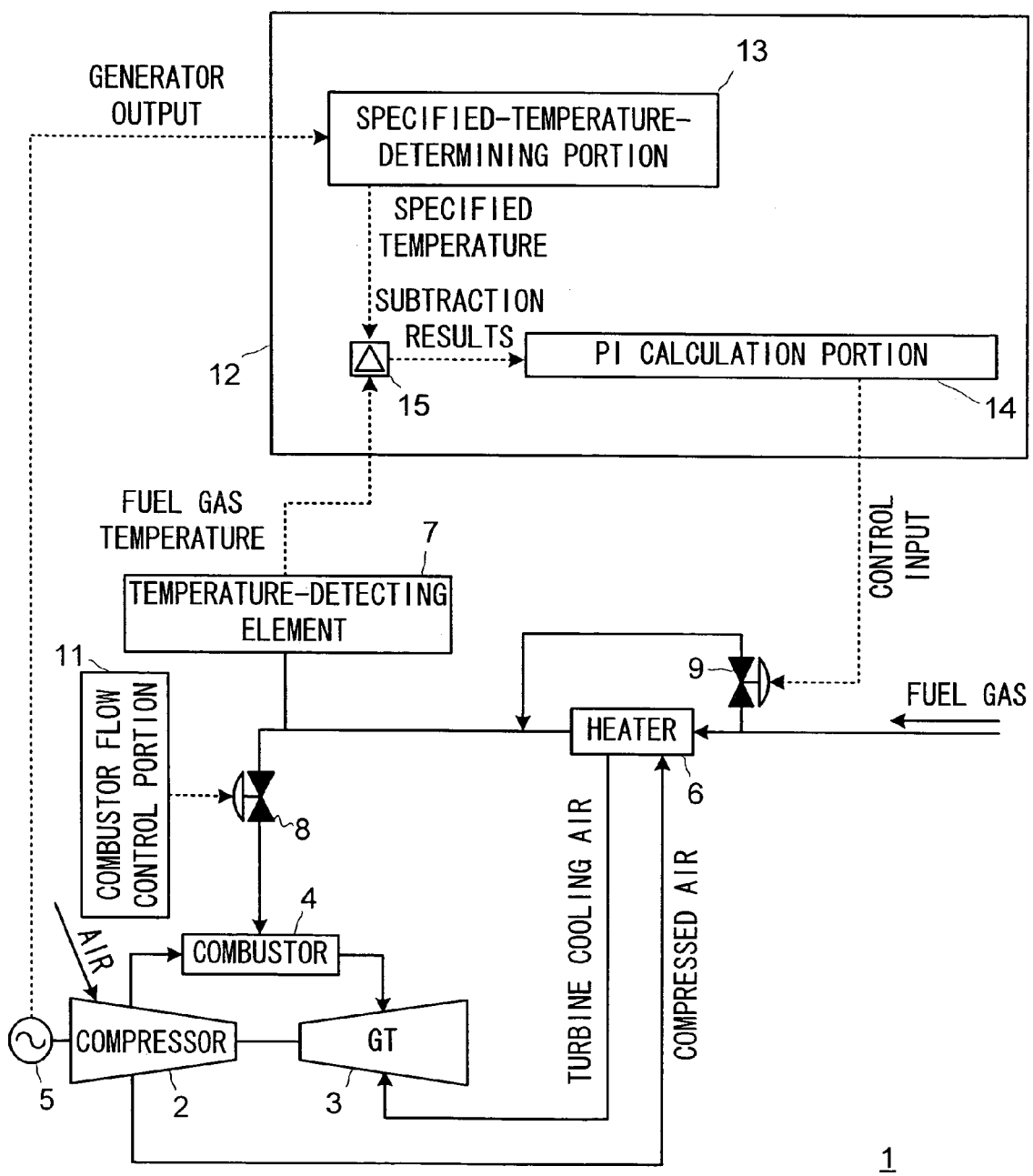
FIG. 10 is a block diagram showing a construction of a gas turbine power generation facility being provided with a conventional fuel gas heating control equipment.
Figure 11:
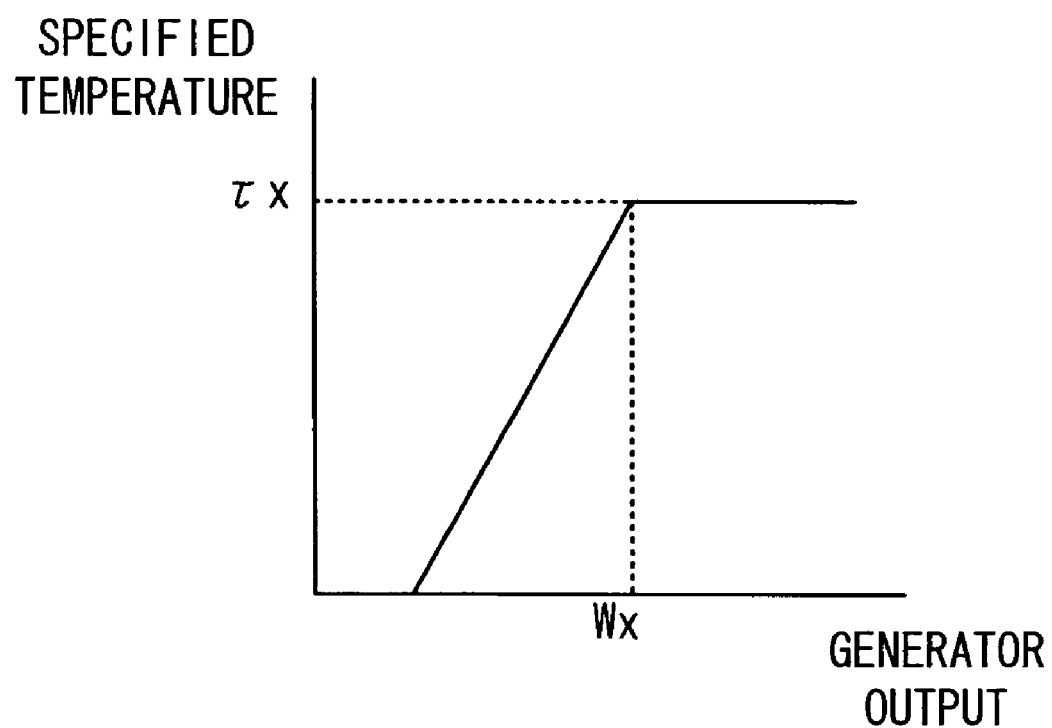
FIG. 11 is a graph showing a relation between a generator output and a specified temperature in a conventional fuel gas heating control equipment.

Referring now to the drawings, a first embodiment of the present invention will be described hereinafter. FIG. 1 is a block diagram showing a construction of a gas turbine power generation facility being provided with a fuel gas heating control equipment in accordance with the present embodiment. In FIG. 1, same portions as in FIG. 10 are provided with same symbols, and the detailed description thereof will be omitted. In addition, movements of a fuel gas and an air are shown with solid lines, and movements of signals of specified values and the like that are to be specified for a block in a subsequent stage are shown with dotted lines.

A gas turbine power generation facility 1a in FIG. 1 comprises a compressor 2 having an ambient air inhaled and compressed to be high pressure so as to generate a high pressure air; a gas turbine 3 being provided concentrically with the compressor 2; a combustor 4 supplying a combustion gas to a gas turbine 3 in order to rotate the gas turbine 3; and a generator 5 generating electric power by rotating the gas turbine 3. In addition, the gas turbine power generation facility 1a in FIG. 1 comprises a combustor flow control valve 8 specifying a flow rate of a fuel to be supplied to the combustor 4; a heater 6 heating a fuel gas in a stage preceding the combustor 4 in advance; and a bypass flow control valve 9 specifying a flow rate of a fuel gas being not heated by bypassing the heater 6.

High pressure air being generated by the compressor 2 is of high temperature and performs heat exchange with a fuel gas by supplying a part of the high pressure air to the heater 6. By having the heater 6 heat the fuel gas previously in the stage preceding to the combustor 4 which burns the fuel gas, combustion efficiency of the fuel gas is enhanced in the combustor 4. In addition, in the subsequent stage to the heater 6, a fuel gas being heated by the heater 6 and a fuel gas not being heated by bypassing the heater 6 are mixed and supplied to the combustor flow control valve 8. Moreover, the subsequent stage to the heater 6 is provided with a temperature-detecting element 7 measuring the gas temperature of the mixed fuel gases. Additionally, the high pressure air completing heat exchange in the heater 6 is cooled by the fuel gas so as to have the temperature thereof decreased and will be supplied to the gas turbine 3 and used for cooling the gas turbine 3.

Furthermore, the gas turbine power generation facility 1 is provided with a combustor flow control portion 11 specifying the lift of a combustor flow control valve 8; and a bypass flow control portion 12a controlling the lift of a bypass flow control valve 9. Here, by providing a value specified by the combustor flow control portion 11 to the combustor flow control valve 8 as a control input, the lift of the combustor flow control valve 8 is adjusted, thereby having the flow rate of a fuel gas to be supplied to the combustor 4 is adjusted. In addition, the fuel gas temperature being measured by the temperature-detecting element 7 being provided to the subsequent stage to the heater 6 is supplied to the bypass flow control portion 12a. Then, the bypass flow control portion 12a performs a predetermined calculation based on the fuel gas temperature being measured and controls the lift of the bypass flow control valve 9, thereby adjusting the flow rate of the fuel gas bypassing the heater 6. In addition, the temperature-detecting element 7 consists of a thermocouple, for example.

Figure 2:
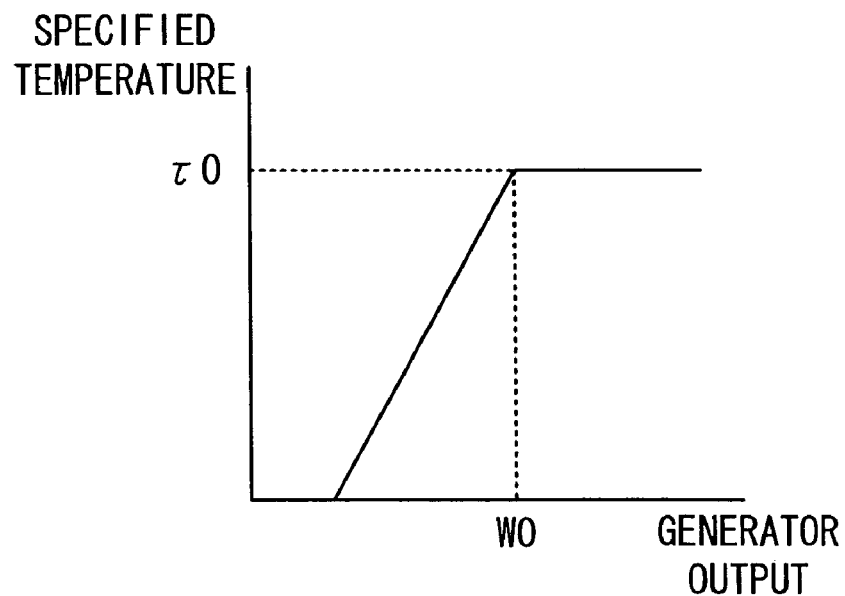
FIG. 2 is a graph showing a relation between a generator output and an aimed specified temperature.

The bypass flow control portion 12a is provided with a specified-temperature-determining portion 13 which determines and outputs an aimed specified temperature being uniquely determined in accordance with the output at the time when the output of the generator 5 is supplied; a subtracter 15 which calculates a difference value by comparing, with an aimed specified temperature being determined by the specified-temperature-determining portion 13, the fuel gas temperature supplied by the temperature-detecting element 7 being provided to the subsequent stage to the heater 6; a PI calculation portion 14 which performs calculations for PI control for the subtraction results of the subtracter 15 and obtains a control input of the bypass flow control valve 9; and in addition, is provided with a gain-determining portion 21 which determines the value of a gain for the calculations that the PI calculation portion 14 performs; and a time-constant-determining portion 22 which determines the value of a time constant for the calculations that the PI calculation portion 14 performs. Here, in the PI calculation portion 14, by using the gain "K" (referred as a "specified gain" hereafter) being supplied by the gain-determining portion 21 and a time constant "T" (referred as a "specified time constant" hereafter) being supplied by the time-constant-determining portion 22 at first the subtraction results of the subtracter 15 are multiplied by "K" (P calculation); and then a value being obtained by having a value being subject to temporal integration of the subtraction results of the subtracter 15 on the basis of the integral time "T" multiplied by "K" (I calculation) is added to the "P" calculation results (PI calculation). FIG. 2 shows an example of a graph depicting the relation between a generator output and a specified temperature.

As shown in FIG. 2, the specified-temperature-determining portion 13 increases the specified temperature at a predetermined ratio immediately after start-up until the generator output attains a predetermined output "W0, " and when the predetermined output "W0 " is attained, the specified temperature is set so as to be constant at a predetermined value "τ0" until the maximum output "Wx" is attained. The value of the predetermined output "W0" may be a value which is very close to the maximum output "Wx." The specified-temperature-determining portion 13 may be provided with a table which contains the value of the specified temperature to be specified in accordance with the generator output, and may be provided with a temperature-determining function which determines the value of a specified temperature to be specified when a generator output is supplied. Here, the temperature-determining function is a function having such a configuration as shown in FIG. 2 where the generator output serves as an axis of abscissa and the specified temperature serves as an axis of ordinate.

Figure 3:
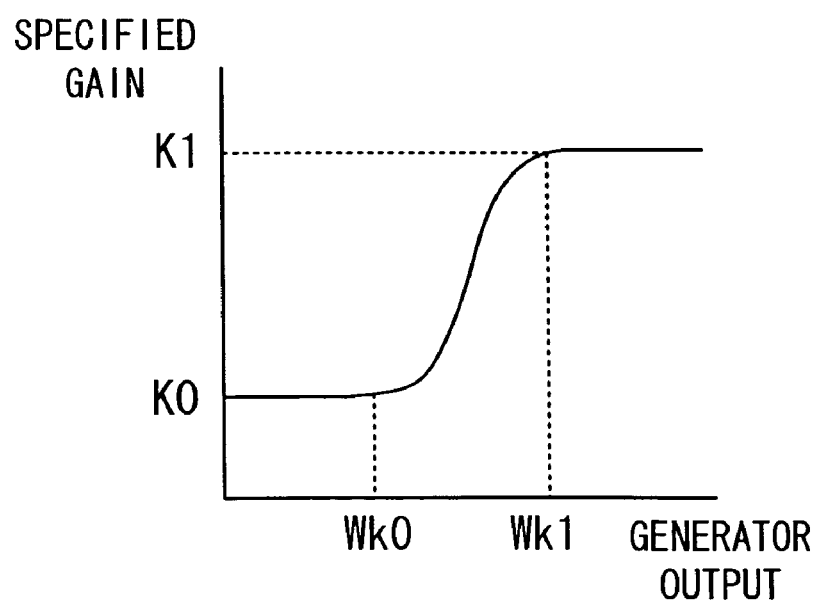
FIG. 3 is a graph showing a relation between a generator output and a specified gain.

When an output of a generator 5 is supplied, the gain-determining portion 21 supplies a value being uniquely determined in accordance with the generator output at the time to the PI calculation portion 14 as a specified gain. FIG. 3 is an example of a graph showing the relation between the generator output and the specified gain.

As shown in FIG. 3, the gain-determining portion 21 specifies the gain so as to be constant at a predetermined value "K0" immediately after start-up until the generator output attains the predetermined value "Wk0;" increases the gain from "K0" when the output exceeds "Wk0;" and then, after the output reaches the predetermined output "Wk1," specifies the specified gain so as to be constant at a larger predetermined value "K1" than "K0" until the maximum output "Wx" is attained. The gain-determining portion 21 may be provided with a table which contains the value of the gain to be specified in accordance with the generator output, and may be provided with a gain-determining function which determines the value of a gain to be specified when a generator output is supplied. Here, the gain-determining function is a function having such a configuration as shown in FIG. 3 where the generator output serves as an axis of abscissa and the specified gain serves as an axis of ordinate.

Figure 4:
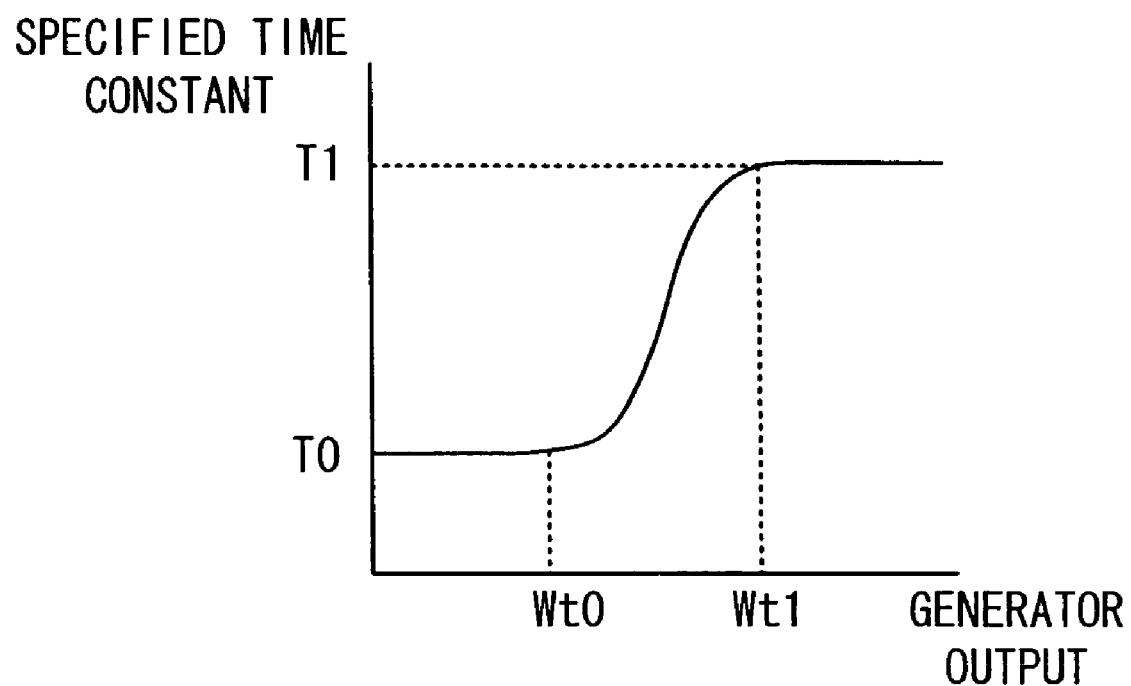
FIG. 4 is a graph showing a relation between a generator output and a specified time constant.

When an output of a generator 5 is supplied, the time-constant-determining portion 22 supplies a value being uniquely determined in accordance with the generator output at the time to the PI calculation portion 14 as a specified time constant. FIG. 4 is an example of a graph showing the relation between the generator output and the specified time constant.

As shown in FIG. 4, the time-constant-determining portion 22 specifies the time constant so as to be constant at a predetermined value "T0" immediately after start-up until the generator output attains the predetermined value "Wt0;" increases the time constant from "T0" when the output exceeds "Wt0;" and then, after the output reaches the predetermined output "Wt1," specifies the specified time constant so as to be constant at a larger predetermined value "T1" than "T0" until the maximum output "Wx" is attained. The time-constant-determining portion 22 may be provided with a table which contains the value of the time constant to be specified in accordance with the generator output, and may be provided with a time-constant-determining function which determines the value of a time constant to be specified when a generator output is supplied. Here, the time-constant-determining function is a function having such a configuration as shown in FIG. 4 where the generator output serves as an axis of abscissa and the specified time constant serves as an axis of ordinate.

Being constructed as described hereinabove, a small time constant (T0) is specified at the time of load fluctuations when the generator output increases. Therefore, responsiveness is good and it is possible to follow a rapid change in temperature. In addition, because a large time constant (T1) is specified when the generator output reaches the maximum output, the fuel gas temperature does not fluctuate in response to a slight change in temperature, thereby achieving a stable fuel gas temperature.

Moreover, because a small gain (K0) is specified during load fluctuations when the generator output increases, overshooting is restrained; and because a large gain (K1) is specified when the generator output reaches the maximum output, deviation is reduced, thereby restraining fluctuations of the fuel gas temperature.

Figure 5:
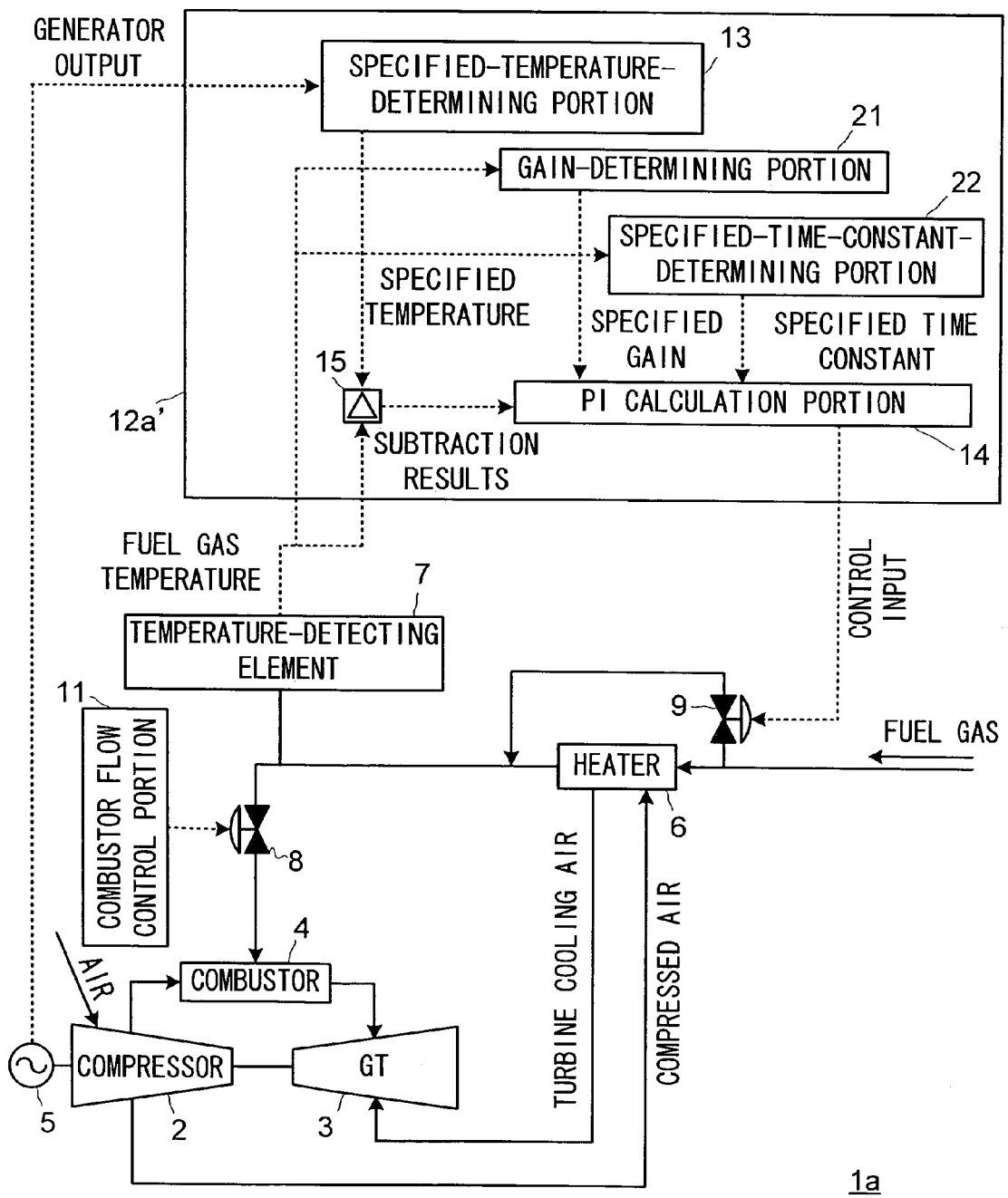
FIG. 5 is another block diagram showing a construction of a gas turbine power generation facility being provided with a fuel gas heating control equipment in accordance with the first embodiment of the present invention.

Additionally, in the present embodiment, the gain and the time constant being used for PI calculations are determined in accordance with the output of the generator 5, but may be specified in accordance with the fuel gas temperature. Here, as shown in FIG. 5, the bypass flow control portion 12a' is constructed in a manner that either of the gain-determining portion 21 and the time-constant-determining portion 22 is provided with a fuel gas temperature by the temperature-detecting element 7. Moreover, FIG. 6 is an example of a graph showing the relation between the fuel gas temperature and the specified gain, and FIG. 7 is an example of a graph showing the relation between the fuel gas temperature and the specified time constant.

Figure 6:
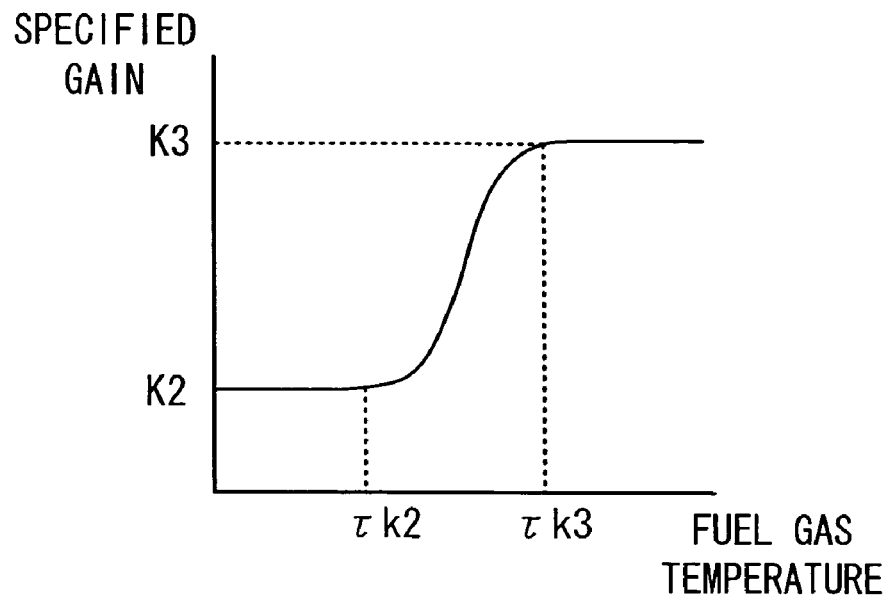
FIG. 6 is a graph showing a relation between a fuel gas temperature and a specified gain.

As shown in FIG. 6, the gain-determining portion 21 specifies the gain so as to be constant at a predetermined value "K2" immediately after start-up until the fuel gas temperature attains a predetermined value "τk2;" increases the gain from "K2" when the fuel gas temperature exceeds "τk2;" and then, after the fuel gas temperature reaches the predetermined value "τk3," specifies the gain so as to be constant at a larger predetermined value "K3" than "K2." The gain-determining portion 21 may be provided with a table which contains the value of the gain to be specified in accordance with the fuel gas temperature, and may be provided with a gain-determining function which determines the value of a gain to be specified when a fuel gas temperature is supplied. Here, the gain-determining function is a function having such a configuration as shown in FIG. 6 where the fuel gas temperature serves as an axis of abscissa and the specified gain serves as an axis of ordinate.

Figure 7:
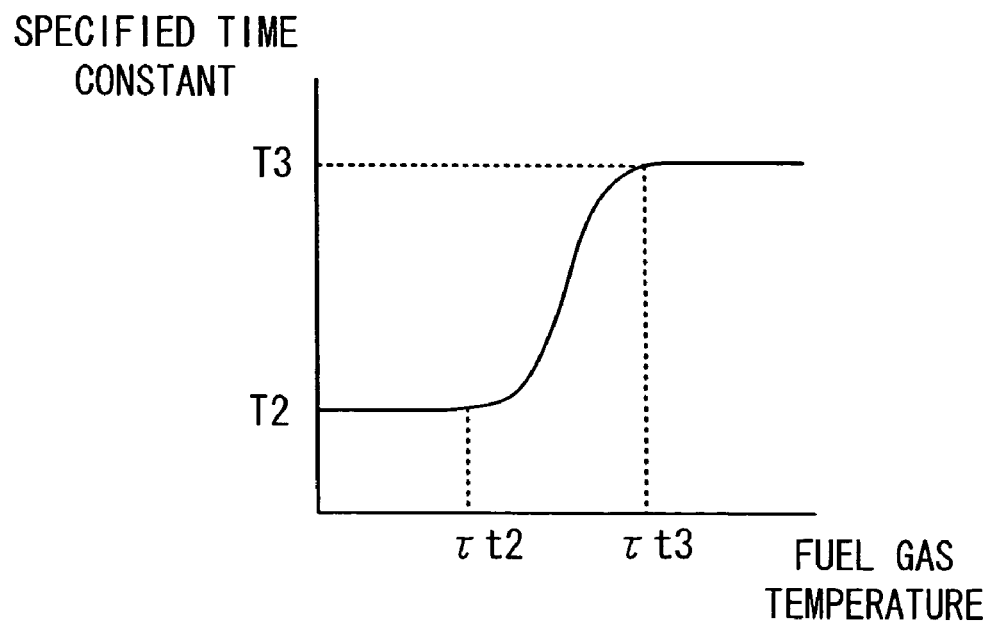
FIG. 7 is a graph showing a relation between a fuel gas temperature and a specified time constant.

As shown in FIG. 7, the time-constant-determining portion 22 specifies the time constant so as to be constant at a predetermined value "T2" immediately after start-up until the fuel gas temperature attains a predetermined value "τt2;" increases the time constant from "T2" when the fuel gas temperature exceeds "τt2;" and then, after the fuel gas temperature reaches the predetermined value "τt3," specifies the time constant so as to be constant at a larger predetermined value "T3" than "T2." The time-constant-determining portion 22 may be provided with a table which contains the value of the time constant to be specified in accordance with the fuel gas temperature, and may be provided with a time-constant-determining function which determines the value of a time constant to be specified when a fuel gas temperature is supplied. Here, the time-constant-determining function is a function having such a configuration as shown in FIG. 7 where the fuel gas temperature serves as an axis of abscissa and the specified time constant serves as an axis of ordinate.

Second Embodiment

Figure 8:
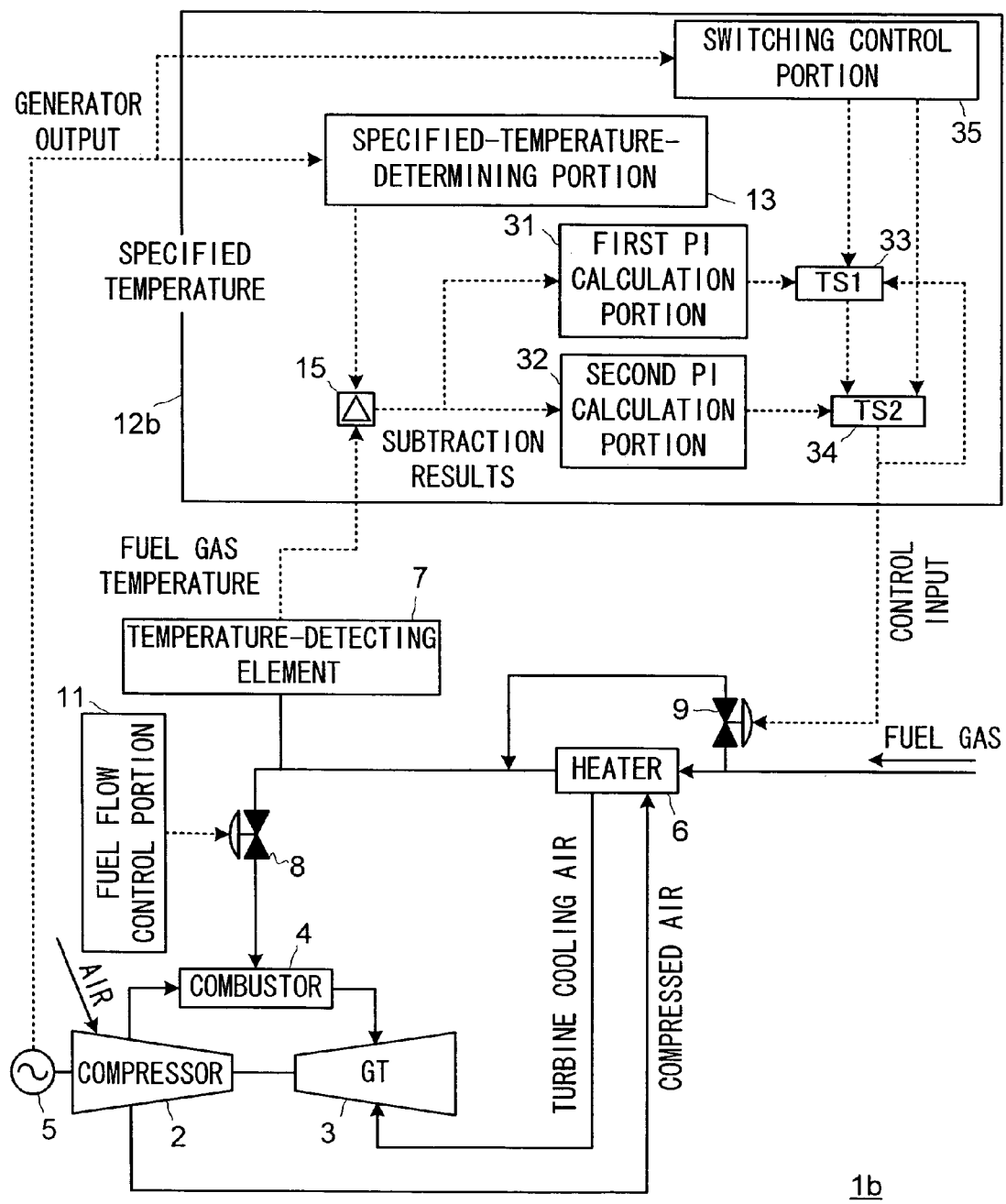
FIG. 8 is a block diagram showing a construction of a gas turbine power generation facility being provided with a fuel gas heating control equipment in accordance with a second embodiment of the present invention.

A second embodiment of the present invention will be described hereinafter by referring to the drawings. FIG. 8 is a block diagram showing a construction of a gas turbine power generation facility being provided with a fuel gas heating control equipment in accordance with the present embodiment. In FIG. 8, same portions as in FIG. 1 are provided with same symbols, and the detailed description thereof will be omitted.

Being compared with a gas turbine power generation facility 1a in accordance with the first embodiment in FIG. 1, a gas turbine power generation facility 1b in FIG. 8 has a different construction of a bypass flow control portion. A bypass flow control portion 12b in accordance with the present embodiment is provided with a first and a second PI calculation portion 31, 32 having a different gain and a different time constant specified in advance in place of the PI calculation portion 13. In addition, are provided a first and a second tracking switch 33, 34 for changing over the calculation results of the first PI calculation portion 31 and the calculation results of the second PI calculation portion 32, respectively, and a switching control portion 35 which controls changing over of the first and the second tracking switches 33 and 34.

A gain "K31" being specified by the first PI calculation portion 31 is specified to be a smaller value than a gain "K32" being specified by the second PI calculation portion 32. In addition, a time constant "T31" being specified by the first PI calculation portion 31 is specified to be a smaller value than a time constant "T32" being specified by the second PI calculation portion 32. Here, in the first PI calculation portion 31, by using the gain "K31" and the time constant "T31," a difference value, being supplied by a subtracter 15, between the specified temperature being determined by the specified-temperature-determining portion 13 and the fuel gas temperature being measured by the temperature-detecting element 7 is multiplied by "K31" ("P" calculation); and a value being obtained by having a value being subject to temporal integration of the subtraction results of the subtracter 15 on the basis of the integral time "T31" multiplied by "K31" ("I" calculation) is added to the "P" calculation results (PI calculation). On the other hand, in the second PI calculation portion 32, by using the gain "K32" and the time constant "T32," a difference value, being supplied by a subtracter 15, between the specified temperature being determined by the specified-temperature-determining portion 13 and the fuel gas temperature being measured by the temperature-detecting element 7 is multiplied by "K32" ("P" calculation); and a value being obtained by having a value being subject to temporal integration of the subtraction results of the subtracter 15 on the basis of the integral time "T32" multiplied by "K32" ("I" calculation) is added to the "P" calculation results (PI calculation).

By comparing the output of a generator 5 with a predetermined value "W1," the switching control portion 35 performs switching control between the first PI calculation portion 31 and the second PI calculation portion 32 based on the comparison results. Specifically, when the generator output is smaller than the predetermined value "W1," the calculation results of the first PI calculation portion 31 are supplied to the bypass flow control valve 9; and when the generator output is larger than the predetermined value "W1," the calculation results of the second PI calculation portion 32 are provided to the bypass flow control valve 9. Switching control being performed by the switching control portion 35 will be described hereinafter.

When the output of the generator 5 begins to increase (during load fluctuations), the switching control portion 35 places the first tracking switch 33 in the "ON" condition and places the second tracking switch 34 in a tracking condition. At this time, the calculation results of the first PI calculation portion 31 are provided to the bypass flow control valve 9, and the bypass valve control valve 9 adjusts the lift thereof on the basis of the calculation results of the first PI calculation portion 31.

At this time, in addition, in the second tracking switch 34 being placed in a tracking condition, the calculation results of the first PI calculation portion 31 are maintained. The calculation results of the first PI calculation portion 31 successively fluctuate in accordance with a change in temperature of the temperature-detecting element 7, but the second tracking switch 34 may hold only the immediately preceding results of calculation being performed by the first PI calculation portion 31.

When the output of the generator 5 reaches a predetermined value "W1," the switching control portion 35 places the second tracking switch 34 in the "ON" condition and places the first tracking switch 33 in a tracking condition until the maximum output "Wx" is attained. The predetermined output "W1" may be a value being very close to the maximum output "Wx." At this time, the calculation results of the first PI calculation portion 31 being maintained by the second tracking switch 34 immediately before switching over are provided to the bypass flow control valve 9 as a first control input immediately after switching over, and the bypass flow control valve 9 adjusts the lift thereof on the basis of the calculation results of the first PI calculation portion 31 being maintained by the second tracking switch 34 immediately before the switching over. Then, after a control input immediately after switching over is provided, the calculation results of the second PI calculation portion 32 are supplied to the bypass flow control valve 9, and the bypass flow control valve 9 adjusts the lift thereof based on the calculation results of the second PI calculation portion 32. In such a manner as described hereinabove, a rapid change in specified lift immediately after switching over in which the gain and the time constant change can be prevented, which makes it possible to avoid a rapid change in fuel gas temperature.

Here, in addition, the calculation results of the second PI calculation portion 32 are maintained by the first tracking switch 33 which is placed in the tracking condition. The calculation results of the second PI calculation portion 32 successively fluctuate in accordance with a change in temperature of the temperature-detecting element 7, but the first tracking switch 33 may maintain the immediately preceding calculation results being performed by the second PI calculation portion 32.

Being constructed as described hereinabove, a small time constant (T31) is specified at the time of load fluctuations when the generator output increases. Therefore, responsiveness is good and it is possible to follow a rapid change in temperature. In addition, because a large time constant (T32) is specified when the generator output reaches the maximum output, the fuel gas temperature does not fluctuate in response to a slight change in temperature, thereby achieving a stable fuel gas temperature. Moreover, because a small gain (K31) is specified during load fluctuations when the generator output increases, overshooting is restrained; and because a large gain (K32) is specified when the generator output reaches the maximum output, deviation is reduced, thereby restraining fluctuations of the fuel gas temperature.

Additionally, at the time of the maximum output, by having the first tracking switch 33 being placed in the tracking condition maintain the calculation results of the second PI calculation portion 32, even in a condition where the output of the generator 5 is reduced from the maximum output to a predetermined value, the lift of the bypass flow control valve 9 can be adjusted on the basis of the calculation results of the second PI calculation portion 32 being maintained by the first tracking switch 33 immediately after switching over when the second PI calculation portion 32 is switched over to the first PI calculation portion 31. As a result, a rapid change in specified lift immediately after switching over in which the gain and the time constant change can be prevented, which makes it possible to avoid a rapid change in fuel gas temperature.

Moreover, being compared with the first embodiment, the present embodiment is so constructed as to select two kinds of calculations being specified in advance and does not need to calculate a gain and a time constant sequentially in accordance with the output. Therefore, the contents of the control thereof are simplified.

Figure 9:
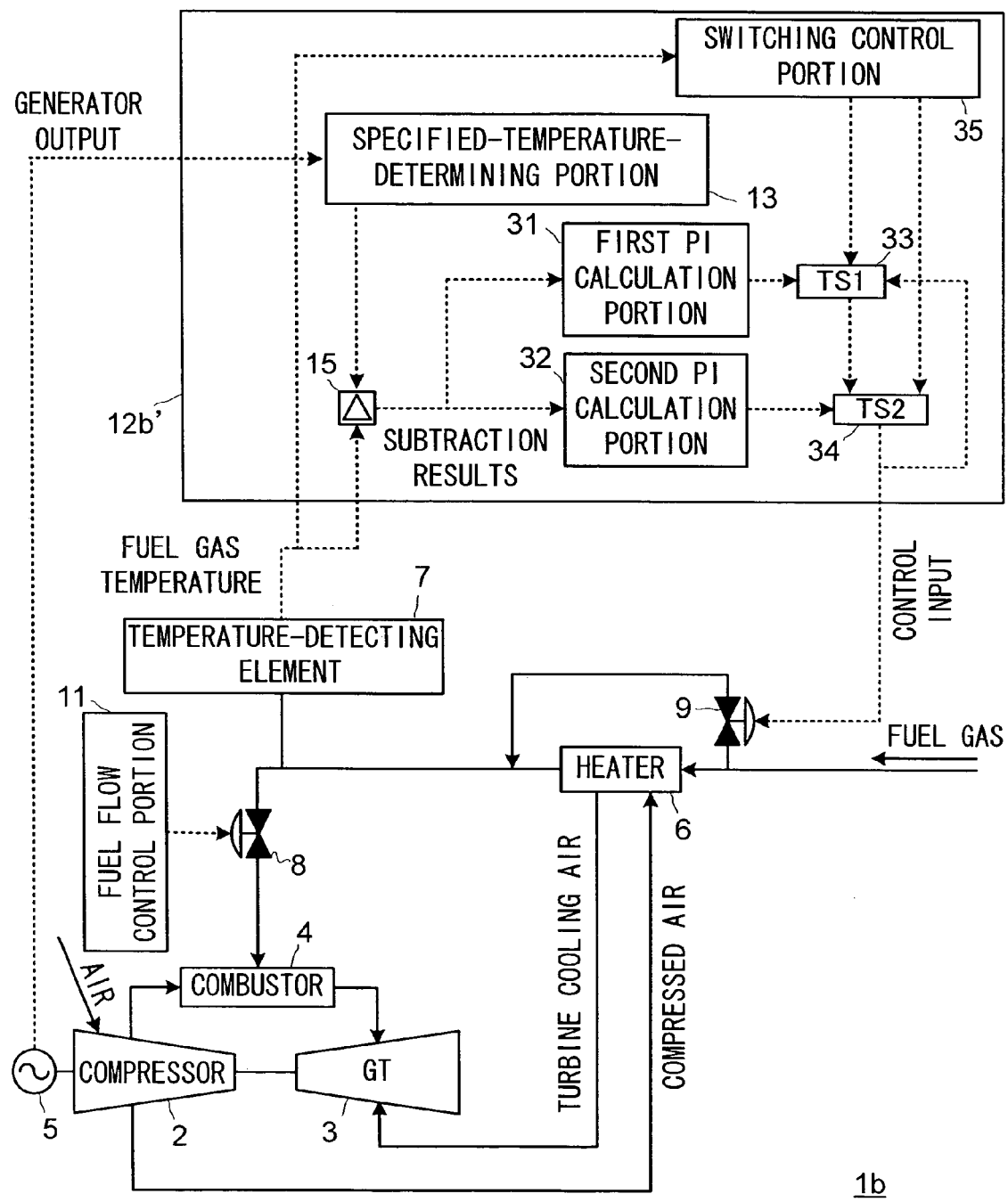
FIG. 9 is another block diagram showing a construction of a gas turbine power generation facility being provided with a fuel gas heating control equipment in accordance with the second embodiment of the present invention.

Furthermore, in the present embodiments, the gain and the time constant to be used for PI calculations are to be determined in accordance with an output of the generator 5, but may be specified in accordance with a fuel gas temperature. Here, as shown in FIG. 9, the bypass flow control portion 12b' is constructed in such a manner as the switching control portion 35 is provided with a fuel gas temperature by the temperature-detecting element 7, and by comparing the fuel gas temperature with a predetermined value "τ2," the first tracking switch 33 and the second tracking switch 34 are controlled.

Here, at the time of load fluctuations when the fuel gas temperature increases, the switching control portion 35 places the first tracking switch 33 in the "ON" condition and places the second tracking switch 34 in a tracking condition until the fuel gas temperature attains a predetermined value "τ2," and provides the calculation results of the first PI calculation portion 31 to the bypass flow control valve 9 as an instruction value of valve lift. In addition, when the fuel gas temperature attains a predetermined value "τ2," the switching control portion 35 switches over, placing the first tracking switch 33 in the tracking condition and placing the second tracking switch 34 in the "ON" condition, respectively. At this time, immediately after switching over, same as the bypass flow control portion 12b, the immediately preceding calculation results of the first PI calculation portion 31 being maintained by the second tracking switch 34 are supplied to the bypass flow control valve 9 and the bypass flow control valve 9 adjusts the lift thereof based on the calculation results. Then, after a control input immediately after switching over is supplied, the calculation results of the second PI calculation portion 32 are supplied to the bypass flow control valve 9 and the bypass flow control valve 9 adjusts the lift thereof based on the calculation results of the second PI calculation portion 32. Additionally, the predetermined value "τ2" may be a value being very close to a fuel gas temperature "τx" being maintained when the generator is operated at the maximum output.

Moreover, in each of the embodiments in accordance with the present invention, control of the lift of the bypass flow control valve 9 has been described while increasing the generator output from start-up until the generator output attains the maximum output. However, the lift of the bypass flow control valve 9 while decreasing the generator output from the maximum output can be controlled in a similar manner.

In addition, in each of the embodiments determining the gain and the time constant in accordance with the generator output or the fuel gas temperature, the generator output or the fuel gas temperature determining the gain and the time constant may be provided with a predetermined allowance. For example, in the first embodiment, the gain is specified to be a predetermined value "K1" when the generator output attains a predetermined output "Wk1," but the gain may be specified to be "K1" when the generator output is within a higher or lower predetermined output range having the predetermined output "Wk1" serve as the center. In the similar way, in the second embodiment, when the generator output attains a predetermined output "W1," the switching control portion 35 places the second tracking switch 34 in the "ON" condition and places the first tracking switch 33 in the tracking condition, but the switching control portion 35 may perform the aforementioned switching performance when the generator output is within the higher or lower predetermined range having the predetermined output "W1" serve as the center.

Furthermore, in each of the above embodiments, control of the lift of the bypass flow control valve 9 while increasing the generator output from start-up until the maximum output has been described, but the lift of the bypass flow control valve 9 can be controlled in a similar manner when the output of the generator 5 is controlled by having a smaller predetermined output than the maximum output serve as an aimed output. In this case, the aforementioned effects can be achieved by performing the similar behaviors to each embodiment being described hereinabove, by replacing the "aimed output during a partial load" with the "maximum output."

What is claimed is:

1. A fuel gas heating control equipment comprising:
a heater heating a fuel gas to be supplied to a combustor;
a first gas system supplying the fuel gas to the heater;
a second gas system being diverged in a stage preceding the heater so as to bypass the heater and connected to the first gas system in a subsequent stage to the heater;
a temperature-detecting element measuring a gas temperature of mixed fuel gas being produced by mixing a first fuel gas passing through the first gas system and being heated by the heater and a second fuel gas passing through the second gas system without being heated by the heater in a subsequent stage to the heater;
a bypass flow control valve adjusting a flow rate of the second fuel gas;
wherein the bypass flow control portion is provided with
a specified-temperature-determining portion which determines an aimed specified temperature in accordance with an output of a generator,
a subtracter which calculates a difference value in accordance with a comparison between the fuel gas temperature measured by the temperature-detecting element and the aimed specified temperature determined by the specified-temperature-determining portion, a gain-determining portion which determines a gain value in accordance with the output of the generator, a time-constant-determining portion which determines the value of a time constant in accordance with the output of the generator, and a PI calculation portion which determines a control input of the bypass flow control valve in accordance with the gain value determined by the gain-determining portion, the value of the time constant determined by the time-constant-determining portion, and the difference value calculated by the subtracter wherein a time constant is specified to be a first time constant when the generator is at a maximum output; and a time constant is specified to be a smaller value than the first time constant during load fluctuations excluding a maximum output of the generator.

2. A fuel gas heating control equipment as described in claim 1:

wherein, a time constant is specified to be a second time constant which is smaller than the first time constant immediately after start-up of the generator; and during load fluctuations of the generator, a value of a time constant to be specified in accordance with an increase in output of the generator is increased from the second time constant.

3. A fuel gas heating control equipment as described in claim 1:

wherein, a gain is specified to be a first gain at a maximum output of the generator, and a gain is specified to be smaller than the first gain during load fluctuations excluding a maximum output of the generator.

4. A fuel gas heating control equipment as described in claim 1:

wherein, a gain is specified to be a first gain at a maximum output of the generator, and a gain is specified to be smaller than the first gain during load fluctuations excluding a maximum output of the generator.

5. A fuel gas heating control equipment as described in claim 2:

wherein, a gain is specified to be a first gain at a maximum output of the generator, and a gain is specified to be smaller than the first gain during load fluctuations excluding a maximum output of the generator.

6. A fuel gas heating control equipment as described in claim 3:

wherein, immediately after start-up of the generator, a gain is specified to be a second gain which is smaller than the first gain, and during load fluctuations of the generator, a value of a gain to be specified in accordance with an increase in output of the generator is increased from the second gain.

7. A fuel gas heating control equipment as described in claim 4:

wherein, a gain is specified to be a second gain being smaller than the first gain immediately after start-up of the generator, and a value of a gain to be specified in accordance with an increase in output of the generator is increased from the second gain during a load fluctuation of the generator.

8. A fuel gas heating control equipment as described in claim 5:

wherein, immediately after start-up of the generator, a gain is specified to be a second gain which is smaller than the first gain, and during load fluctuations of the generator, a value of a gain to be specified in accordance with an increase in output of the generator is increased from the second gain.

9. A fuel gas heating control equipment as described in claim 1:

wherein, the bypass flow control portion comprises:

a first PI calculation portion calculating by PI control having a value of a time constant serve as a third time constant and having a value of a gain serve as a third gain; and a second PI calculation portion calculating by PI control having a value of a time constant serve as a fourth time constant which is larger than the third time constant and having a value of a gain serve as a fourth gain which is larger than the third gain;

adjusts a lift of the bypass flow control valve based on results of calculation being performed by the first PI calculation portion during load fluctuations of the generator; and adjusts a lift of the bypass flow control valve based on results of calculation being performed by the second PI calculation portion at a maximum output of the generator.

10. A fuel gas heating control equipment as described in claim 9:

wherein, the bypass flow control portion is provided with a tracking switch which changes over calculation results of the first PI calculation portion and calculation results of the second PI calculation portion;

wherein, calculation results of the first PI calculation portion are selected by the tracking switch during load fluctuations of the generator; and calculation results of the second PI calculation portion are selected by the tracking switch at a maximum output of the generator.

11. A fuel gas heating control equipment as described in claim 10:

wherein, the tracking switch tracks calculation results of a calculation portion being selected between the first PI calculation portion and the second PI calculation portion; and wherein, a lift of the bypass flow control valve is adjusted based on calculation results being tracked by the tracking switch immediately after switching over when the first PI calculation portion and the second PI calculation portion are changed over.

12. A gas turbine power generation facility comprising:

a compressor generating high pressure air by compressing an air being supplied to be high pressure;

a combustor performing combustion by a high pressure air from the compressor and a fuel gas and discharging combustion gas;

a gas turbine being rotary driven by being supplied with combustion gas from the combustor; and a fuel gas heating control equipment controlling a temperature of a fuel gas being supplied to the combustor; wherein, the fuel gas heating control equipment comprises:

a heater heating a fuel gas to be supplied to the combustor;

a first gas system supplying the fuel gas to the heater;

a second gas system being diverged in a stage preceding the heater so as to bypass the heater and connected to the first gas system in a subsequent stage to the heater;

a temperature-detecting element measuring a gas temperature of mixed fuel gas being produced by mixing a first fuel gas passing through the first gas system and being heated by the heater and a second fuel gas passing through the second gas system without being heated by the heater in the subsequent stage to the heater;

a bypass flow control valve adjusting a flow rate of the second fuel gas; and a bypass flow control portion controlling a lift of the bypass flow control valve, wherein the bypass flow control portion comprises:

a specified-temperature-determining portion which determines an aimed specified temperature in accordance with an output of a generator, a subtracter which calculates a difference value in accordance with a comparison between the fuel gas temperature measured by the temperature-detecting element and the aimed specified temperature determined by the specified-temperature-determining portion, a gain-determining portion which determines a gain value in accordance with the output of the generator, a time-constant-determining portion which determines the value of a time constant in accordance with the output of the generator, and a PI calculation portion which determines a control input of the bypass flow control valve in accordance with the gain value determined by the gain-determining portion, the value of the time constant determined by the time-constant-determining portion, and the difference value calculated by the subtracter wherein a time constant is specified to be a first time constant when the generator is at a maximum output; and a time constant is specified to be a smaller value than the first time constant during load fluctuations excluding a maximum output of the generator.

13. A controlling method of a fuel gas heating control equipment, the fuel gas heating control equipment including a heater heating a fuel gas to be supplied to a combustor, a first gas system supplying the fuel gas to the heater, a second gas system being diverged in a stage preceding the heater so as to bypass the heater and connected to the first gas system in a subsequent stage to the heater, a temperature-detecting element measuring a gas temperature of mixed fuel gas being produced by mixing a first fuel gas passing through the first gas system and being heated by the heater and a second fuel gas passing through the second gas system without being heated by the heater in a subsequent stage to the heater, a bypass flow control valve adjusting a flow rate of the second fuel gas, and a bypass flow control portion controlling a lift of the bypass flow control valve based on the gas temperature of the mixed gas and an output of a generator, the controlling method comprising:

performing feedback control in accordance with the output of the generator by performing PI control based on results of comparison between an aimed temperature being specified in accordance with an output of a generator and the gas temperature being detected by the temperature-detecting element and by changing a gain and a time constant in the PI control in accordance with an output of the generator, wherein a lift of the bypass flow control valve is adjusted by the feedback control wherein a time constant is specified to be a first time constant when the generator is at a maximum output; and a time constant is specified to be a smaller value than the first time constant during load fluctuations excluding a maximum output of the generator.

14. A controlling method of a fuel gas heating control equipment as described in claim 13, wherein a time constant is specified to be a second time constant which is smaller than the first time constant immediately after start-up of the generator, and during load fluctuations of the generator, a value of a time constant to be specified in accordance with an increase in output of the generator is increased from the second time constant.

15. A controlling method of a fuel gas heating control equipment as described in claim 13, wherein a gain is specified to be a first gain at a maximum output of the generator, and a gain is specified to be smaller than the first gain during load fluctuations excluding a maximum output of the generator.

16. A controlling method of a fuel gas heating control equipment as described in claim 15, wherein immediately after start-up of the generator, a gain is specified to be a second gain which is smaller than the first gain, and during load fluctuations of the generator, a value of a gain to be specified in accordance with an increase in output of the generator is increased from the second gain.

17. A controlling method of a fuel gas heating control equipment as described in claim 13, wherein the bypass flow control portion being provided with a first PI calculation portion calculating by PI control having a value of a time constant serve as a third time constant and having a value of a gain serve as a third gain, and a second PI calculation portion calculating by PI control having a value of a time constant serve as a fourth time constant which is larger than the third time constant and having a value of a gain serve as a fourth gain which is larger than the third gain, further wherein a lift of the bypass flow control valve is adjusted based on results of calculation being performed by the first PI calculation portion during load fluctuations of the generator, and a lift of the bypass flow control valve is adjusted based on results of calculation being performed by the second PI calculation portion at a maximum output of the generator.

18. A controlling method of a fuel gas heating control equipment as described in claim 17, wherein the bypass flow control portion is provided with a tracking switch which changes over calculation results of the first PI calculation portion and calculation results of the second PI calculation portion, further wherein calculation results of the first PI calculation portion are selected by the tracking switch during load fluctuations of the generator, and calculation results of the second PI calculation portion are selected by the tracking switch at a maximum output of the generator.

19. A controlling method of a fuel gas heating control equipment as described in claim 18, wherein the tracking switch tracks calculation results of a calculation portion being selected between the first PI calculation portion and the second PI calculation portion, and a lift of the bypass flow control valve is adjusted based on calculation results being tracked by the tracking switch immediately after switching over when the first PI calculation portion and the second PI calculation portion are changed over.

20. A controlling method of a gas turbine power generation facility, the gas turbine power generation facility including a compressor generating high pressure air by compressing an air being supplied to be high pressure, a combustor performing combustion by a high pressure air from the compressor and a fuel gas and discharging combustion gas, a gas turbine being rotary driven by being supplied with combustion gas from the combustor, and a fuel gas heating control equipment controlling a temperature of a fuel gas being supplied to the combustor, the fuel gas heating control equipment being provided with a heater heating a fuel gas to be supplied to the combustor, a first gas system supplying the fuel gas to the heater, a second gas system being diverged in a stage preceding the heater so as to bypass the heater and connected to the first gas system in a subsequent stage to the heater, a temperature-detecting element measuring a gas temperature of mixed fuel gas being produced by mixing a first fuel gas passing through the first gas system and being heated by the heater and a second fuel gas passing through the second gas system without being heated by the heater in the subsequent stage to the heater, a bypass flow control valve adjusting a flow rate of the second fuel gas, and a bypass flow control portion controlling a lift of the bypass flow control valve based on the gas temperature of the mixed gas and an output of a generator, the bypass flow control portion, the controlling method comprising:

performing feedback control in accordance with the output of the generator by performing PI control based on results of comparison between an aimed temperature being specified in accordance with an output of a generator and the gas temperature being detected by the temperature-detecting element and by changing a gain and a time constant in the PI control in accordance with an output of the generator, wherein a lift of the bypass flow control valve is adjusted by the feedback control, the first fuel gas heated therein by heat exchange between the first fuel gas being supplied to the heater, and thereby a part of the high pressure air being discharged from the compressor at the heater, and a part of the high pressure air being cooled by heat exchange in the heater is supplied to the gas turbine and used for cooling the gas turbine wherein a time constant is specified to be a first time constant when the generator is at a maximum output; and a time constant is specified to be a smaller value than the first time constant during load fluctuations excluding a maximum output of the generator.

* * * * *